United States Patent [19]

Goodwin

[11] Patent Number: 5,573,346
[45] Date of Patent: Nov. 12, 1996

[54] TUBE AND CONNECTOR COMBINATION

[75] Inventor: David Goodwin, Surrey, United Kingdom

[73] Assignee: Kee Klamps Limited, London, England

[21] Appl. No.: 381,905

[22] PCT Filed: Aug. 3, 1993

[86] PCT No.: PCT/GB93/01633

§ 371 Date: Feb. 13, 1995

§ 102(e) Date: Feb. 13, 1995

[87] PCT Pub. No.: WO94/04778

PCT Pub. Date: Mar. 3, 1994

[30] Foreign Application Priority Data

Aug. 15, 1992 [GB] United Kingdom ............... 9217423

[51] Int. Cl.$^6$ .................................................... F16B 7/18
[52] U.S. Cl. .................... 403/282; 403/283; 403/296; 256/65
[58] Field of Search .............................. 403/274, 280, 403/281, 282, 283, 296, 298, 348, 359; 411/508, 55; 256/59, 65

[56] References Cited

U.S. PATENT DOCUMENTS

| 2,279,954 | 4/1942 | Sipe | 403/274 |
| 3,281,171 | 10/1966 | Hughes | 403/280 |
| 3,312,139 | 4/1967 | Di Cristina | 403/280 X |
| 3,666,298 | 5/1972 | Reilly | 403/298 X |
| 3,731,958 | 5/1973 | Offenbroich | 403/280 |
| 4,770,560 | 9/1988 | Ott | 403/296 |
| 5,108,215 | 4/1992 | Hassid et al. | 403/298 |

FOREIGN PATENT DOCUMENTS

| 528400 | 6/1931 | Germany | 403/280 |
| 2316567 | 10/1974 | Germany | 403/359 |
| 69804 | 3/1991 | Japan | 403/348 |
| 7701817 | 7/1977 | Netherlands | 403/296 |

Primary Examiner—Harry C. Kim
Attorney, Agent, or Firm—Young & Thompson

[57] ABSTRACT

A tube connector (10) to enable a straight tube or even a curved tube of tight radius of curvature to be connected to a structural member has a flat cutter disc (11) shaped to fit in the end of an internally splined tube (20). The outer edge of the cutter disc has a series of teeth (12) which cut into and locate with the splines when the cutter disc is rotated in the tube. The cutter disc may have a floating central insert (25) screw threaded to allow connection to another structural member without a need for precise alignment.

23 Claims, 5 Drawing Sheets

TUBE AND CONNECTOR COMBINATION

FIELD OF THE INVENTION

This invention relates to a tube and connector combination for use in structurally interconnecting a tube with another member, an assembly of a tube and member interconnected by said tube and connector combination and a method of interconnecting a tube with another member. It relates in particular, though not exclusively, to a structural interconnection incorporating a curved tube, such as may be utilised in a handrail or balustrade assembly.

BACKGROUND OF THE INVENTION

Tube connectors for forming a structural interconnection with tubes are well-known and connectors of a type which provide a continuous flush surface for example between two tubes are used commonly in the construction of handrails and balustrades. An example of a connector of this type is described in GB-A-2070722. Another type of connector for joining tubes is described in U.S. Pat. No. 4,770,560. Whilst known connector devices can provide a satisfactory interconnection they often place a limitation on the maximum allowable curvature of the end region of a tube to which a connection is being made, or the minimum axial length of tube or member to which a connection can be made.

SUMMARY OF THE INVENTION

The present invention seeks to provide a tube and connector combination, an assembly incorporating said tube and connector combination and method of forming a structural interconnection with a tube suitable for tubes having a tight radius of curvature, for example a tube in which the major axis has a radius of curvature equal to the outer diameter of the tube.

In accordance with one of its aspects the present invention provides a tube and connector combination comprising a tube and a connector for insertion in an end of the tube, wherein the tube is internally splined and the connector comprises:

a substantially planar disc-like cutter for insertion in the end of the internally splined tube, abutment means offset from the center of the cutter whereby application of torque to the abutment means may cause the cutter to rotate about a major axis passing through the center of the cutter, and at least three protruding tooth formations at the radially outer edge of the cutter, each formation having a cutting edge which faces radially outwards and extends substantially in a circumferential direction relative to the major axis of the cutter whereby rotation of the cutter about said major axis causes the teeth to cut into the internal splines of the tube.

Preferably an insert is positioned centrally relative to the cutter about said major axis, the insert being captively located axially relative to the cutter and possessing a limited range of free movement relative to the cutter. It is envisaged that usually the insert shall be capable of a limited range of free relative movement in a radial direction but alternatively or additionally it may have the capability for limited relative movement in an axial direction, i.e. parallel with said major axis. It is envisaged that usually the insert will be restrained against free rotation relative to the cutter.

The cutter may comprise a blade part having the tooth formations and a support part arranged to co-operate with the blade part to assist in resisting distortion of the blade part.

Each tooth formation may have a cutting edge which is of part spiral form, that is a shape in which the distance of a cutting edge from the major axis of the cutter increases progressively from one end of the cutting edge to another. Alternative or additional to said spiral form the cutting edges may be serrated. The invention envisages that where the cutting edges are of a spiral form, they shall each be of the same orientation.

The spiral form of a cutting edge may lie in a plane perpendicular to the major axis of the cutter or it may be inclined, e.g. in a manner similar to part of the edge of a tapered screw thread. In the case of cutting edges which are inclined relative to the plane of the cutter, it is preferred that an even number of teeth are provided and that the cutting edges are arranged in a balanced configuration in which one half are inclined in one direction and the other half in the opposite direction, teeth of the two inclinations being alternated with one another in the circumferential direction. Thus the cutting action does not result in a helical screw-like movement and potential for misalignment; if the cutter is initially positioned square with a tube end, the action of the cutter edges upon rotation of the cutter will not act necessarily to result in misalignment.

The insert may be provided with a screw-threaded through bore or other retention formation for a purpose which will be described below. The insert may be shaped in relation to the cutter such that it is free to rotate relative thereto through a restricted angle range.

An insert in the cutter may be of a short tubular form having a flange at one end and a groove whereby a circlip may be located in the groove to provide axial retention of the insert relative to the cutter. The groove is dimensioned in relation to the cutter so that the insert is free to move relative to the cutter through a limited axial and/or radial distance.

Alternatively the insert may comprise a pair of axially extending limbs, typically of spring material, for extending through a central opening in the cutter so that end lugs on the limbs may co-operate with the main body of the insert to hold it clipped to the cutter.

The cutter preferably has a central opening shaped to allow the insert to be positioned rotationally relative to the cutter in any selected one of a plurality of positions. Preferably the insert and cutter are positionable relative to one another at positions which are angularly spaced by no more than 60° and more preferably no more than 45° relative to one another.

The tooth formations are circumferentially spaced by recess portions whereby in use the connector may be placed in the end of the splined shaft with the splines initially in register with said recesses and with the tooth formations in register with recesses between the tube splines, thus ensuring that the cutter lies centrally in the tube.

The invention provides also a method of constructing a structural interconnection comprising inserting the tube connector in the end of the internally splined tube as described in the preceding paragraph applying torque to the cutter via said abutment means whereby the teeth are urged to cut and become embedded in the tube splines and then utilising retention means, such as a screw-threaded bolt, to co-operate with the tube connector (and insert if provided) and thereby form a structural interconnection with another member with which the retention member is operatively associated.

The method may comprise use of an alignment member which is locatable accurately in the end of the splined tube to extend beyond the end of that tube into alignment with another member, such as another internally splined tube. In addition to assisting in achieving good alignment of the members which are being structurally interconnected the alignment member may be relied upon in the resultant assembly to assist in restraining relative movement of the members transversely of the longitudinal direction of the interconnection.

In the resulting assembly of a structural interconnection the alignment member may be fully concealed or it may have an outwardly extending formation which lies between the interconnected members and is thereby exposed.

Suitable materials for the splined tube include materials such as aluminum, aluminum alloy, mild steel and other materials, including plastics, which do not unduly resist cutting action.

The tube and connector combination of the present invention is particularly useful for forming an interconnection between two tubes and in particular interconnection with a curved type tube. Particularly for joining a curved type tube it is preferred that at least the tube is fitted with a tube connector of the type having an insert as aforedescribed. The facility for the insert to float, e.g. move radially and axially (and thus be able to tilt) relative to the cutter allows the inserts of two neighbouring tube connectors in the confronting ends of two tubes to align notwithstanding that centers of the two cutters may be out of alignment by virtue of curvature of at least one of the tubes and also by virtue of any possible eccentricity arising if the tooth formations of a cutter disc do not all embed uniformly and equally into the splines of a tube.

The tube and connector combination may be used also to form an interconnection between a tube, such as a curved tube, and another member of non-tubular form. The interconnected tubes or other member may be of a circular or other, e.g. hexagonal, external profile.

The invention further provides a handrail or balustrade installation comprising an interconnection between a tube and another member which incorporates the tube and connector combination of the invention or is formed by the method of the invention.

BRIEF DESCRIPTION OF THE DRAWINGS

Embodiments of the present invention will now be described, by way of example only, with reference to the accompanying diagrammatic drawings in which.

DESCRIPTION OF THE PREFERRED EMBODIMENTS

Figure 2:
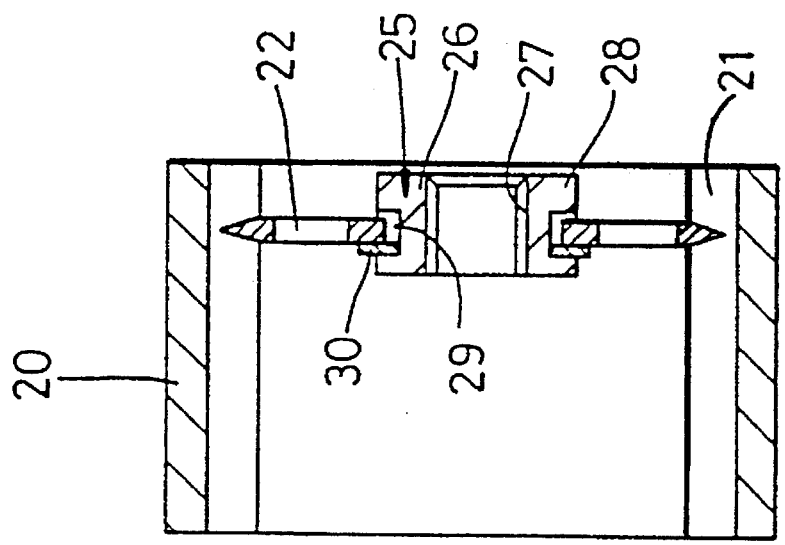
FIG. 2 is a longitudinal sectional view of the components shown in FIG. 1.

A tube connector 10 comprises a flat metal cutter disc 11 the periphery of which has four outwardly extending and circumferentially uniformly spaced tooth formations 12. Each tooth formation has a cutting edge 13 which extends parallel with the plane of the disc. The radial distance of the cutting edge 13 from the major axis 14 of the disc increases from one end 15 of the cutting edge to the other 16. The increase of radial distance is substantially progressive over a major part of the length of the cutting edge, but in the vicinity of the outermost end 16 there is a greater rate of increase to provide a guide portion 17 for a purpose described below.

The circumferential extent of each cutting edge 13 is selected such that the cutter disc will fit into a splined tube 20 with each tooth formation lying in register with the space 21 between a successive pair of tube splines. The aforementioned guide portion 17 of each cutting edge is dimensioned so as to bear lightly against the wall of the tube between successive splines thereby to maintain the cutter disc substantially concentrically relative to the bore of the tube.

The cutter disc is provided with two diametrically opposed holes 22 which act as abutments to facilitate in situ rotation of the cutter disc relative to the tube.

The central region of the cutter disc has an insert 25 captively located relative thereto. The insert is in the form of a short sleeve 26 the internal surface 27 of which is screw-threaded and is provided at one end with a flange 28. The sleeve also has a groove formation 29 into which a circlip 30 may be inserted so that the insert is held captively in an axial direction relative to the cutter disc. The insert is dimensioned relative to a central opening in the cutter disc such that it is able to move slightly in both a radial and an axial direction. It is also of a non-circular outer shape adapted to co-operate with formations (not shown) on the cutter so that it is free to rotate relative to the cutter but only through a restricted angle range.

Figure 1:
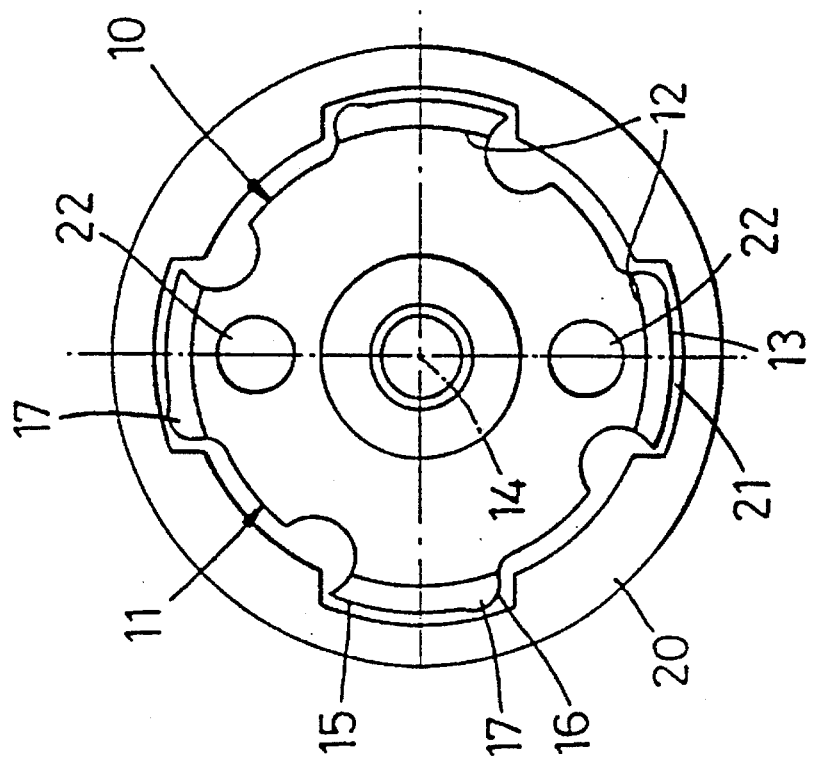
FIG. 1 is an end view of a cutter in accordance with an embodiment of the present invention positioned in the end of a tube.
Figure 3A:
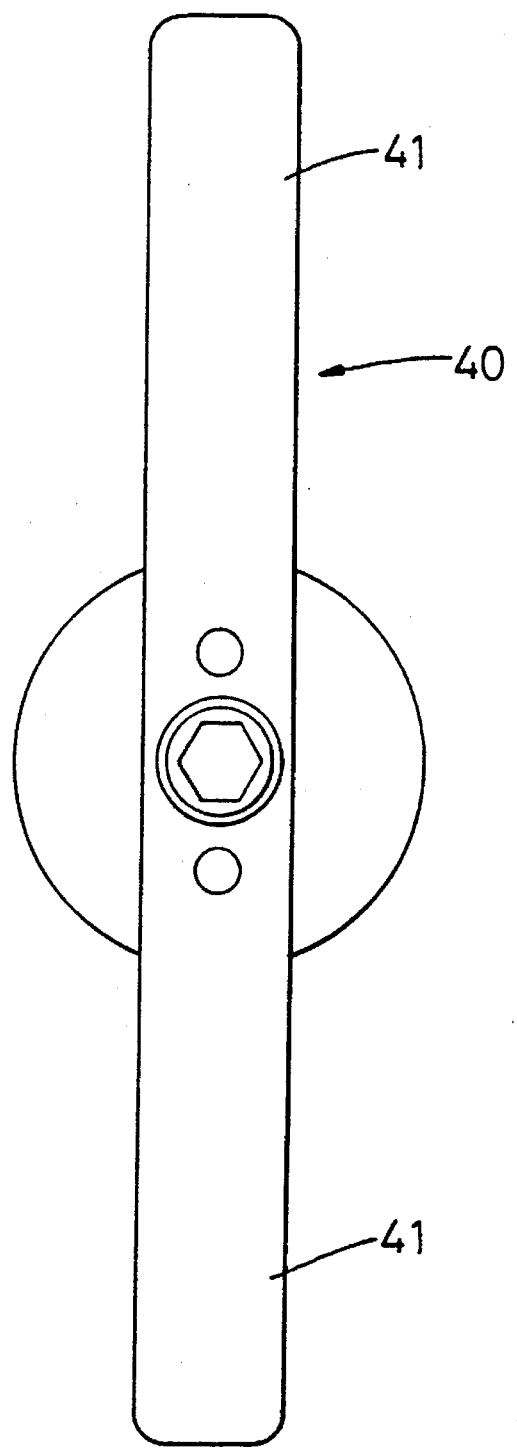
FIGS. 3A and 3B are respectively end and sectional views of the components of FIGS. 1 and 2 in combination with an operating tool.
Figure 3B:
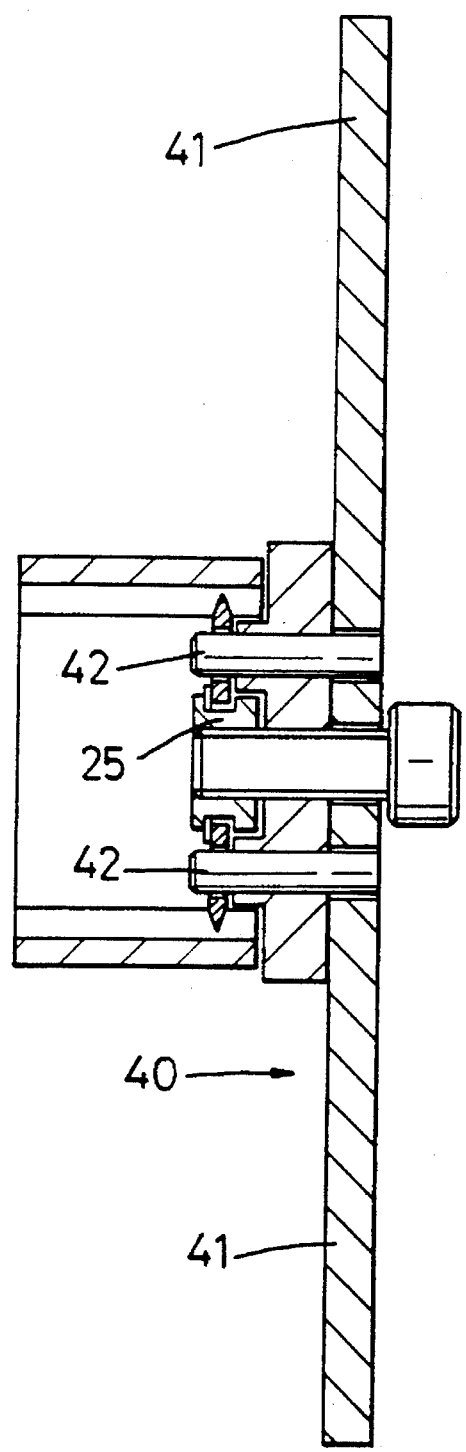

To form an interconnection the cutter disc is positioned in the end of a splined tube, as illustrated in FIGS. 1 and 2, and is then rotated by means of an external tool 40 having a pair of operating arms 41 and a pair of engagement pins 42 which locate in the aforedescribed abutment holes 22 of the cutter disc. The cutter disc is rotated clockwise as viewed in FIG. 1 so that the cutting edges of the four teeth embed in respective splines.

The screw-threaded bore 27 of the insert may then be utilised to receive a bolt associated with another member so that that other member can be connected to the splined tube by tightening of the bolt.

Two tube ends may be joined together by utilising a pair of the aforedescribed tube connectors inserted, as described above, one in each respective end of the pair of tubes. The neighbouring inserts are then secured axially relative to one another by means of a bolt.

Figure 4:
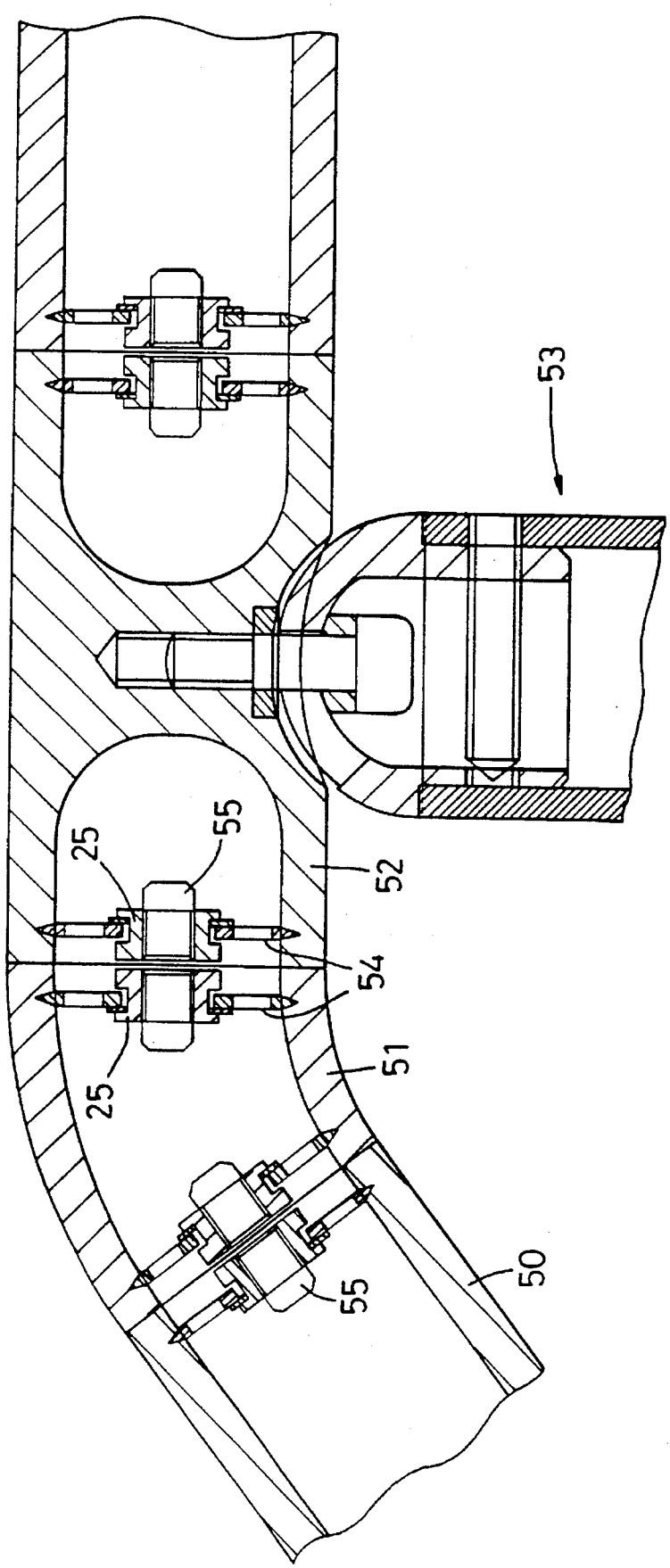
FIG. 4 is a sectional view of part of a handrail assembly comprising interconnections in accordance with the present invention.

FIG. 4 shows an assembly in which a long length tube 50 is secured to a curved short length tube 51 which in turn is secured to a rigid type tube connector 52, e g one which is supported by a handrail post 53. Each component 50,51,52 is internally splined. The pair of tube connectors 54 between the curved tube 51 and rigid connector 52 may be secured together by a bolt 55 which can be turned by means of a screw driver inserted through the length of the curved tube 51 prior to assembly of the long length tube 50. By virtue of the ability for the inserts 25 to move radially the screw-threaded bores of the neighbouring inserts are able to move into alignment so that the bolt 55 may extend therethrough and form a firm interconnection without any tendency to displace the tube end radially relative to the connector 52, i e without tending to inhibit formation of an assembly having a continuous flush surface at the interconnection.

The long length tube 50 may then be secured to the other end of the curved tube 51 by a similar procedure. During assembly a bolt may be secured to one insert e g by loctite or other similar adhesive to prevent free rotation of the bolt as it is screwed into the other insert by relative rotation of the two tubes.

The cutter disc does not need necessarily to have four or another even number of tooth formations. It may for example have as a minimum three formations, any fewer number of formations being unsatisfactory in that it is not then possible effectively to maintain concentricity between a cutter disc and tube.

Figure 5A:
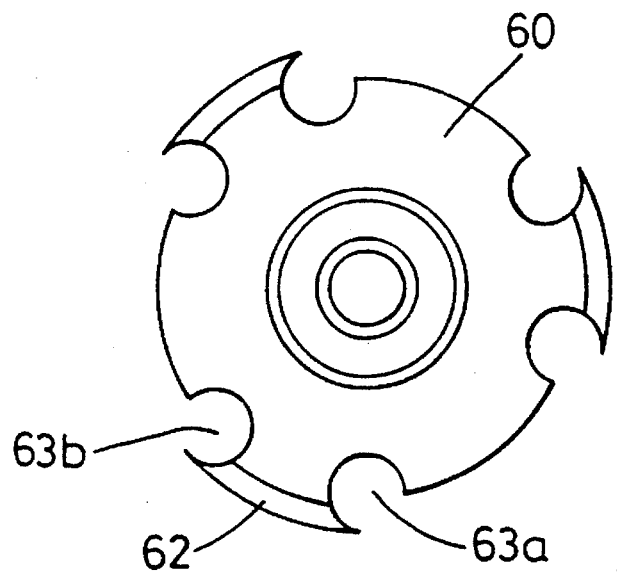
FIGS. 5A and 5B are views of a cutter and tube of another embodiment.
Figure 5B:
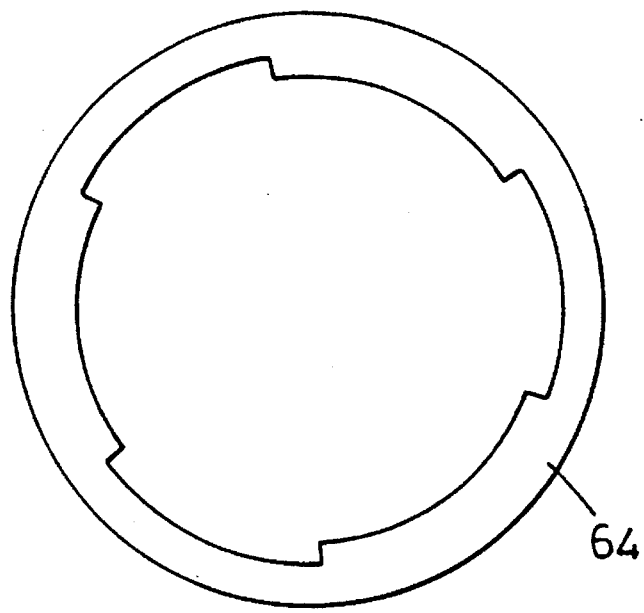

An example of the connector 60 having only three tooth formations 62 and for use in a tube 64 having three splines is shown in FIGS. 5A and 5B. In this construction the periphery of the cutter disc 61 is provided with three pairs of recesses 63a,63b for engagement by an operating tool of a kind having three engagement pins. One recess 63a of each pair is engageable for rotation of the disc in a first direction upon assembly, and the other recess 63b of each pair is engageable for rotation in a reverse direction in the event that it is required to remove the tube connector from within a splined tube.

Figure 6:
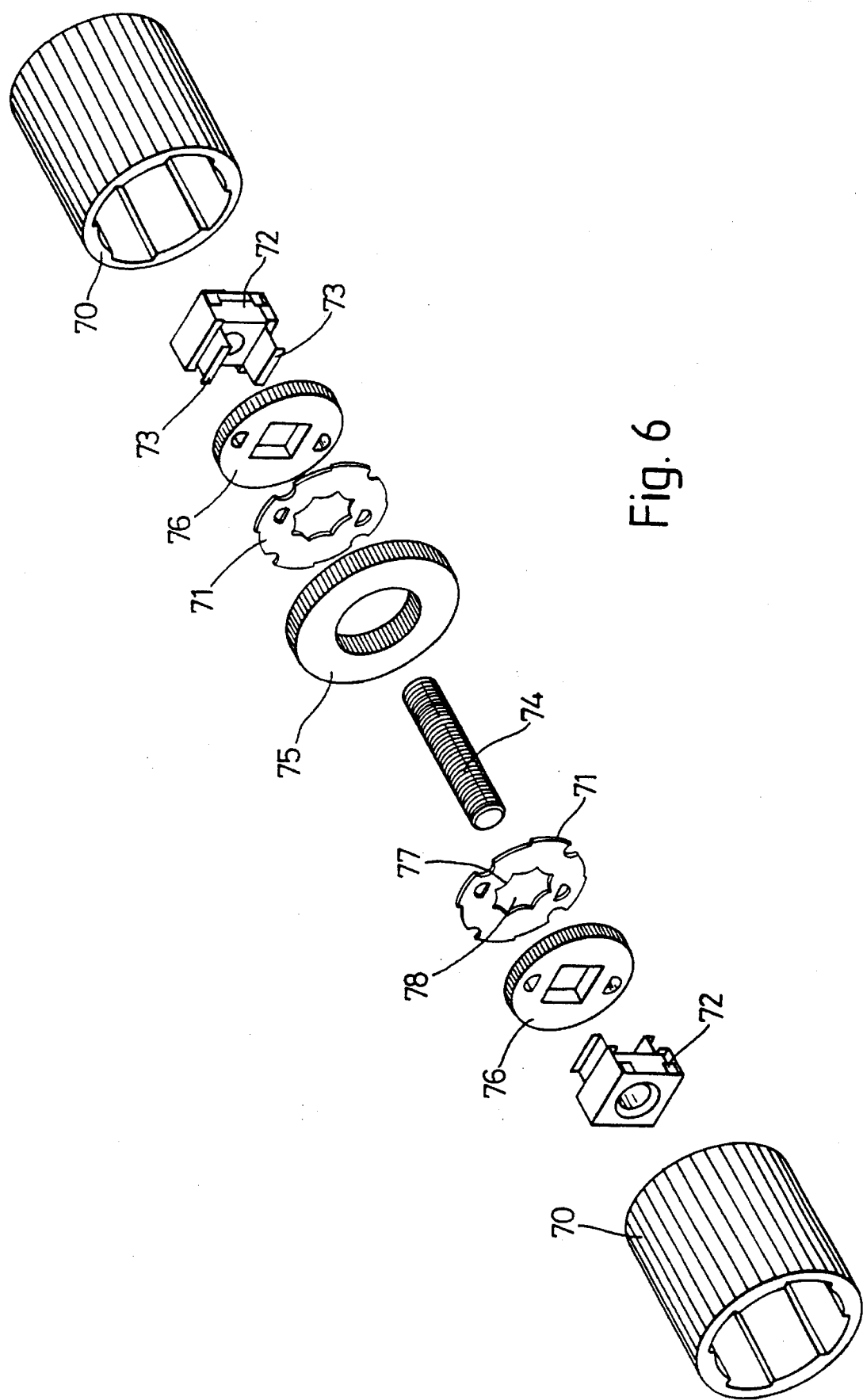
FIG. 6 is an exploded perspective view of a tube connector in accordance with another embodiment of the invention.

Another embodiment is shown in FIG. 6. Two handrail ends 70 of internally splined type are interconnected by a pair of disc-like cutter blades 71, inserts 72 having spring clip limbs 73, and a central screw threaded bolt 74. Interconnection is achieved substantially as described above in relation to FIGS. 1 to 4 but differs by the provision of an annular alignment disc 75 arranged to lie, in the assembly, internally at the junction of the two handrail ends 70. The disc 75 is a close fit in each handrail and therefore ensures alignment as well as withstanding transverse shear loads.

The FIG. 6 device and method differs also in that each cutter blade 71 comprises a backing disc 76 which spreads over the blades 71 the axial loading created by the bolt 74 on assembly and thus helps resist distortion of blades. Furthermore the cutter blades each have a star shaped central opening 78 defining pluralities of pairs of surfaces 77 for contact by the pairs of flat surfaces of clip limbs 73. In this illustration eight pairs are provided so that the insert may be selectively positioned and held in any one of eight angular positions relative to the cutter blade. This allows adjustment to ensure that the handrail ends may have a required alignment when the bolt 74 is tightened, this being of value particularly if one of the handrail sections is curved.

I claim:

1. A tube and connector combination comprising a tube and a connector for insertion in an end of the tube, wherein the tube is internally splined and the connector comprises: a substantially planar disc-like cutter for insertion in the end of the internally splined tube; abutment means offset from the center of the cutter whereby application of torque to the abutment means causes the cutter to rotate about a major axis passing through the center of the cutter, and at least three protruding tooth formations at the radially outer edge of the cutter, each formation having a cutting edge which faces radially outwards and extends substantially in a circumferential direction relative to the major axis of the cutter, whereby rotation of the cutter about said major axis causes the tooth formations to cut into the internal splines of the tube.

2. A tube and connector combination according to claim 1, further including an insert positioned centrally relative to the cutter about said major axis, the insert being captively located axially relative to the cutter and possessing a limited range of free movement relative to the cutter.

3. A tube and connector combination according to claim 2, wherein the limited range of free movement is in a radial direction.

4. A tube and connector combination according to claim 3, wherein the limited movement relative to the cutter is in an axial direction parallel with said major axis.

5. A tube and connector combination according to claim 2, wherein the limited movement relative to the cutter is in an axial direction parallel with said major axis.

6. A tube and connector combination according to claim 2, wherein the insert is of a short tubular form and comprises a flange at one end and a circlip groove, whereby a circlip in said groove may provide axial retention of the insert relative to the cutter.

7. A tube and connector combination according to claim 2, wherein the insert comprises a pair of limbs to extend through an opening in the cutter and allow the insert to be held to the cutter by clip action.

8. A tube and connector combination according to claim 2, wherein the insert is provided with a screw-threaded through bore.

9. A tube and connector combination according to claim 2, wherein the insert is restrained against free rotation relative to the cutter.

10. A tube and connector combination according to claim 2, wherein the insert is positionable relative to the cutter in any selected one of a plurality of positions.

11. A tube and connector combination according to claim 10, wherein the selectable relative positions are angularly spaced by no more than 60°.

12. A tube and connector combination according to claim 1, wherein the cutting edges are of part spiral form.

13. A tube and connector combination according to claim 12, wherein the cutting edges lie in a plane which is inclined relative to the major axis of the cutter.

14. A tube and connector combination according to claim 13, wherein the tooth formations comprise an even number of teeth of spiral form, said teeth being arranged in a balanced configuration in which one half are inclined in one direction, and the other half in the opposite direction.

15. A tube and connector combination according to claim 1, wherein the cutting edges are serrated.

16. A tube and connector combination according to claim 1, wherein the tooth formations are circumferentially spaced by recess portions, whereby in use, the connector may be placed in the end of the splined tube with the splines initially in register with said recess portions, and with the tooth formations in register with recesses between the tube splines.

17. Method of constructing a structural interconnection using a tube and connector combination according to claim 1, said method comprising:

inserting the connector in the end of the internally splined tube;

applying torque to the connector via said abutment means, whereby the tooth format ions are urged to cut and become embedded in the tube splines; and then utilizing retention means to co-operate with the connector and form a structural interconnection with another member with which the retention means is operatively associated.

18. An assembly comprising a tube and another member structurally interconnected by a connector for insertion in an end of the tube, wherein the tube is internally splined and the connector comprises: a substantially planar disc-like cutter for insertion in the end of the internally splined tube; abutment means offset from the center of the cutter whereby application of torque to the abutment means causes the cutter to rotate about a major axis passing through the center of the cutter, and at least three protruding tooth formations at the radially outer edge of the cutter, each formation having a cutting edge which faces radially outwards and extends substantially in a circumferential direction relative to the major axis of the cutter, whereby rotation of the cutter about said major axis causes the tooth formations to cut into the internal splines of the tube.

19. An assembly according to claim 18, wherein said tube is of a curved type.

20. An assembly according to claim 19, wherein the major axis of the tube has a radius of curvature equal to the outer diameter of the tube.

21. An assembly according to claim 18, wherein the tube is provided with an alignment member which extends beyond the end of that tube into alignment with another member of the structural interconnection.

22. An assembly according to claim 21, wherein the alignment member comprises an extension formation which lies between the interconnected members.

23. A handrail installation comprising a plurality of assemblies according to claim 18.

* * * * *